United States Patent
Inoue et al.

[11] Patent Number: 6,136,431
[45] Date of Patent: Oct. 24, 2000

[54] SOFT MAGNETIC THIN FILM AND MAGNETIC HEAD

[75] Inventors: Yoshihiko Inoue; Junichi Honda; Fusashige Tokutake, all of Miyagi, Japan

[73] Assignee: Sony Corporation, Tokyo, Japan

[21] Appl. No.: 09/066,785

[22] Filed: Apr. 28, 1998

[30] Foreign Application Priority Data

Apr. 30, 1997 [JP] Japan ................................ P09-113137

[51] Int. Cl.$^7$ ...................................................... G11B 5/66
[52] U.S. Cl. ..................... 428/332; 428/336; 428/692; 428/694 R; 428/694 T; 428/694 TM; 428/900; 360/113; 360/119; 360/125; 360/126; 204/192.2
[58] Field of Search ............................. 428/692, 694 R, 428/694 TM, 332, 336, 900; 360/113, 119, 125, 126; 204/197.2

[56] References Cited

U.S. PATENT DOCUMENTS

| | | | |
|---|---|---|---|
| 5,538,802 | 7/1996 | Kitaori | 428/654 T |
| 5,573,863 | 11/1996 | Hayakawa | 428/694 T |
| 5,599,635 | 2/1997 | Katori | 428/692 |
| 5,736,264 | 4/1998 | Ishikawa et al. | 428/694 R |
| 5,786,103 | 7/1998 | Ohmori | 428/694 R |
| 5,817,429 | 10/1998 | Ishikawa et al. | 428/610 |
| 5,837,392 | 11/1998 | Katori | 428/692 |

*Primary Examiner*—Leszek Kiliman
*Attorney, Agent, or Firm*—Hill & Simpson

[57] ABSTRACT

The present invention provides a soft magnetic thin film having a high magnetic permeability and showing a magnetic isotropy which can be obtained without a complicated production procedure, and a magnetic head using this soft magnetic thin film.

The soft magnetic thin film has a composition expressed as $Fe_a M_b N_c O_d$ wherein M represents at least one of Ta, Zr, Hf, Nb, and Ti; and a, b, c, and d represent atomic percents which are defined as follows: $71 \leq a \leq 85$; $6 \leq b \leq 15$; $9 \leq c \leq 16$; and $1 \leq d \leq 3.5$.

7 Claims, 9 Drawing Sheets

SOFT MAGNETIC THIN FILM AND MAGNETIC HEAD

BACKGROUND OF THE INVENTION

1. Field of the Invention

The present invention relates to a soft-magnetic thin film and a magnetic head using this soft-magnetic thin film.

2. Description of the Prior Art

Recently, in the field of magnetic recording, with increase of the signal recording density and the recording/reproduction frequency, it has become extremely important to obtain a high coercive force of a magnetic recording medium which in turn requires a high saturation magnetic flux density of a magnetic head.

To cope with this, as a magnetic head capable of high density recording on a magnetic recording medium having a high coercive force and enabling to obtain a high electromagnetic conversion efficiency, there has been implemented into practice a layered type magnetic head having a magnetic path which is entirely constituted by a magnetic film having a saturation magnetic flux density and a high magnetic permeability. Such a magnetic head requires a soft-magnetic thin film having a magnetic isotropy having a high magnetic permeability in any directions because a loop-shaped magnetic path is formed during recording and reproduction.

As has been described above, the soft-magnetic thin film used in a magnetic head should have a high magnetic permeability and a magnetic isotropy.

By the way, in order to obtain the magnetic isotropy of a soft-magnetic thin film used in the layered type magnetic head, for example, during or after formation of a soft magnetic thin film, a rotational magnetic field is applied to the soft magnetic thin film for inducing a magnetic isotropy.

However, this method for producing a magnetic head having a soft magnetic thin film through the aforementioned application of a rotational magnetic field has a problem that a complicated film formation is required and a number of production processes is increased, which increase production costs.

Moreover, in a mass production of a magnetic head, film formation is carried out by mounting a plurality of non-magnetic substrates in a film forming apparatus for magnetic film formation. Consequently, the non-magnetic substrates are covered with soft magnetic films having different incident angles of film formation. The soft magnetic thin film having different angles of film formation have different magnetic isotropy and different magnetic permeability values, causing a magnetic anisotropy.

SUMMARY OF THE INVENTION

It is therefore an object of the present invention to provide a soft magnetic thin film and a magnetic head having a high magnetic permeability and a magnetic isotropy without a complicated production procedure.

Furthermore, the present invention has another object to provide a soft magnetic thin film and a magnetic head which will not cause a magnetic anisotropy even if produced by way of mass production.

In order to achieve the aforementioned objects, the soft magnetic thin film according to the present invention has a composition $Fe_aM_bN_cO_d$ (M represents at least one of Ta, Zr, Hf, Nb, and Ti; and a, b, c, and d represent atomic percents) wherein a, b, c, and d are respectively in the following ranges: $71 \leq a \leq 85$, $6 \leq b \leq 15$, $9 \leq c \leq 16$, and $1 \leq d \leq 3,5$.

Such a soft magnetic thin film contains 1 to 3.5 atomic percent of oxygen and enables to increase the magnetic permeability in comparison to a conventional soft magnetic thin film without carrying out a complicated production procedure as well as to suppress a magnetic anisotropy caused during film formation.

Moreover, the present invention provides a magnetic head including a pair of magnetic core half bodies, each having a magnetic layer sandwiched by a pair of non-magnetic substrates, wherein the magnetic core half bodies are brought into abutment with each other so that ends of the magnetic layers oppose to each other, forming a magnetic gap on an abutment boundary between these magnetic layers, and the magnetic layer, at least partially, has a composition expressed as $Fe_aM_bN_cO_d$ (wherein M represents at least one of Ta, Zr, Hf, Nb, and Ti; and a, b, c, and d represent atomic % of the respective elements), in which elements ratios a, b, c, and d are respectively in ranges as follows: $71 \leq a \leq 85$; $6 \leq b \leq 15$; $9 \leq c \leq 16$; and $1 \leq d \leq 3.5$.

The magnetic layer is a layered magnetic film prepared by combining via an insulating film a plurality of unit layered films, each consisting of the soft magnetic thin film and a non-magnetic film which are layered alternately.

The unit layered film has the soft magnetic thin films which are connected static-magnetically to each other.

The unit layered film consists of soft magnetic thin films each having a thickness of 50 to 500 nm and non-magnetic films each having a thickness of 1 to 10 nm.

The insulating film has a thickness of 100 to 500 nm.

The magnetic head thus prepared has a soft magnetic thin film containing 1 to 3.5 atomic percent of oxygen and accordingly, enables to increase the magnetic permeability in comparison to a conventional soft magnetic thin film without carrying out a complicated production procedure as well as to suppress a magnetic anisotropy, which in turn improves the recording/reproduction characteristic.

DETAILED DESCRIPTION OF PREFERRED EMBODIMENTS

Hereinafter, description will be directed to a soft magnetic thin film and a magnetic head according to the present invention with reference to the attached drawings.

The soft magnetic thin film is formed, for example, on a pair of non-magnetic substrates, which are bonded to each other to prepare soft magnetic thin film used in a magnetic head having a magnetic gap.

This soft magnetic thin film has a composition expressed by $Fe_aM_bN_cO_d$. Here, M represents at least one of Ta, Zr, Hf, Nb, and Ti atoms but M may consists of a plurality of atoms. Moreover, this soft magnetic thin film, from the viewpoint of soft magnetic characteristic, contains Fe, M, nitrogen, and oxygen respectively defined by a, b, c, and d indicating atomic %. Fe is contained in the range of about $71 \leq a \leq$ about 85; M is contained in the range of about $6 \leq b$ about 15; nitrogen is contained in the range of about $9 \leq c \leq$ about 16; and oxygen is contained in the range of about $1 \leq d \leq$ about 3.5.

As a method for forming this soft magnetic thin film, a vacuum thin film formation is used such as a deposition in a gas, a cluster ion beam method, a sputtering method, and the like. However, from the viewpoint of the close attachment to a non-magnetic substrate, it is preferable to employ the sputtering method. The sputtering method may be, for example, DC two-electrode type sputtering, a high frequency sputtering, a bias type sputtering, opposite-target type sputtering, and the like. Any one of these sputtering methods can be used.

Moreover, a soft magnetic thin film having a composition expressed by Fe—M—N is normally formed by using an Fe—M alloy target in a mixed atmosphere of argon gas and nitrogen gas. When forming the aforementioned soft magnetic thin film in the aforementioned vacuum thin film forming, an oxygen gas is introduced to the mixed atmosphere of the argon gas and the nitrogen gas. By introducing the oxygen gas into the film formation atmosphere, the oxygen content of the soft magnetic thin film is controlled. That is, when forming the aforementioned soft magnetic thin film, by changing the oxygen pressure with respect to the film formation atmosphere, it is possible to control the oxygen atomic % contained in the soft magnetic thin film.

Figure 1:
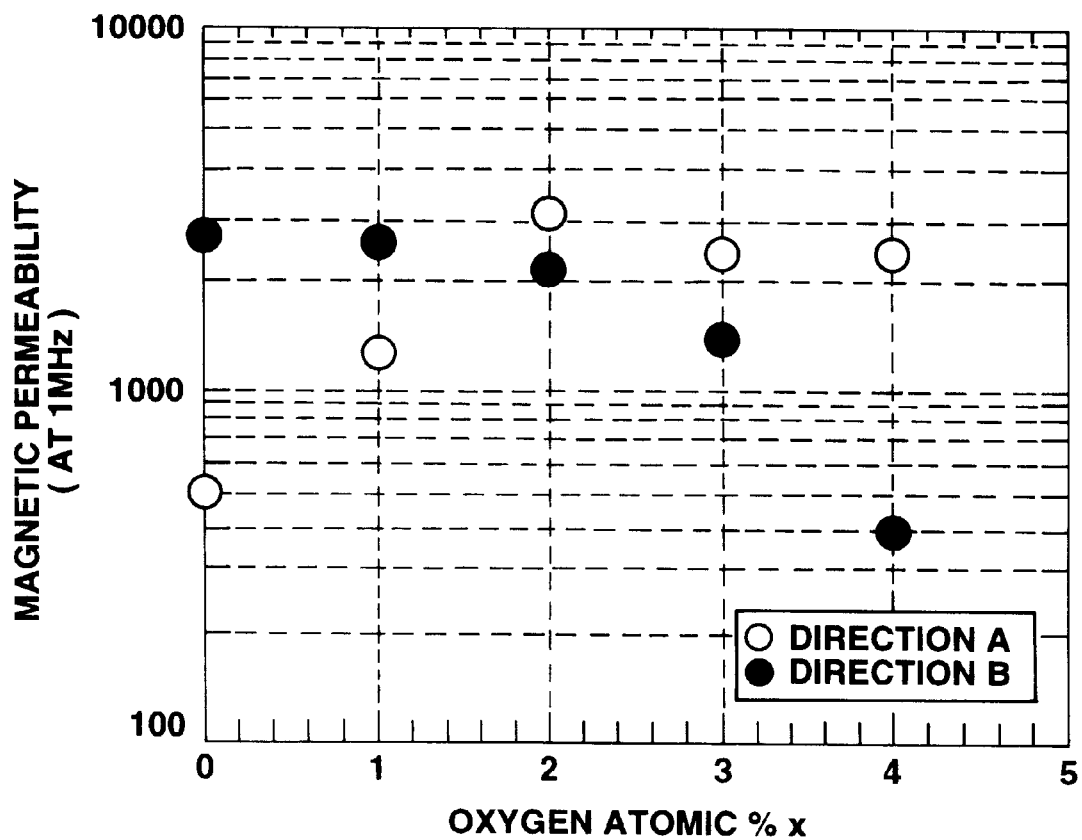
FIG. 1 shows a relationship between a magnetic permeability and an atomic % of oxygen contained in the soft magnetic thin film according to the present invention.
Figure 2:
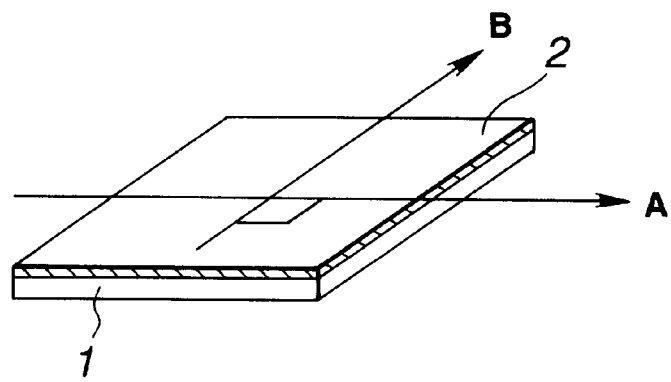
FIG. 2 shows a direction of a soft magnetic thin film formed on a non-magnetic substrate.

Here, when the oxygen content is 0 to 4 atomic percents, the soft magnetic thin film shows magnetic permeability shown in FIG. 1. Note that this FIG. 1 shows the magnetic permeability measured when the exciting magnetic field is about 1 MHz. For this measurement of magnetic permeability, as shown in FIG. 2, a soft magnetic thin film 2 is formed on a non-magnetic substrate 1. In this Figure, the direction A is assumed to be a magnetization difficult direction when the oxygen atomic percent is about 0, and the direction B is assumed to orthogonally intersect the direction A. In FIG. 1, ablack circle indicates a relationship between the oxygen atomic % and the magnetic permeability in the direction A, whereas a white circle indicates relationship between the oxygen atomic % and the magnetic permeability in the direction B.

According to this FIG. 1, when the oxygen atomic % contained in the soft magnetic thin film is about 0, the magnetic permeability in the A direction is greatly different from that of the B direction: the magnetic permeability in the B direction is smaller than the permeability in the A direction. That is, the soft magnetic thin film containing 0 atomic % of oxygen exhibits magnetic anisotropy.

When the soft magnetic thin film contains about 1 atomic % of oxygen, the magnetic permeability in both of the A direction and B direction is equal to or above 1000 and a smaller difference can be seen between the magnetic permeability of the A direction and that of the B direction. In comparison to the oxygen content of 0 atomic %, the film shows a magnetic isotropy.

Next, when the soft magnetic thin film contains about 2 atomic % of oxygen, the magnetic permeability values of the A direction and the B direction are reversed. The B direction has greater magnetic permeability than the A direction. Moreover, in comparison to the soft magnetic thin film containing about 1 atomic % of oxygen, the magnetic permeability difference between the A direction and the B direction is further smaller. In comparison to the case of about 1 atomic % of oxygen, the soft magnetic thin film shows a magnetic isotropy.

Next, when the soft magnetic thin film contains about 3 atomic % of oxygen, the magnetic permeability difference between the A direction and the B direction becomes greater compared to the case of 2 atomic % of oxygen. Moreover, in the range of up to about 3.5 atomic % of oxygen, the magnetic permeability values in the A direction and B direction are about 1000 or above which is greater compared to the magnetic permeability value when 0 atomic % of oxygen is contained.

Furthermore, when the oxygen atomic % is about 4, the difference in the magnetic permeability in the A direction and in the B direction becomes further greater. Moreover, the magnetic permeability value in the A direction becomes smaller. Thus, the soft magnetic thin film containing about 4 atomic % of oxygen exhibits a magnetic anisotropy.

Consequently, in such a soft magnetic thin film, by changing the atomic % of oxygen, it is possible to change the magnetic permeability in the A direction and the magnetic permeability in the B direction. That is, by changing the atomic % of oxygen, the magnetic anisotropy of this soft magnetic thin film can be changed into magnetic isotropy. Moreover, in this soft magnetic thin film, by defining the oxygen atomic % to be about 1 to 3, it is possible to obtain a higher magnetic permeability both in the A direction and in the B direction, in comparison to the magnetic permeability obtained when the atomic % of oxygen is about 0, as well as to reduce the magnetic permeability difference in the A direction and B direction, thus suppressing the magnetic anisotropy into a magnetic isotropy.

Next, explanation will be given on an example of a magnetic head having the aforementioned soft magnetic thin film.

Figure 3:
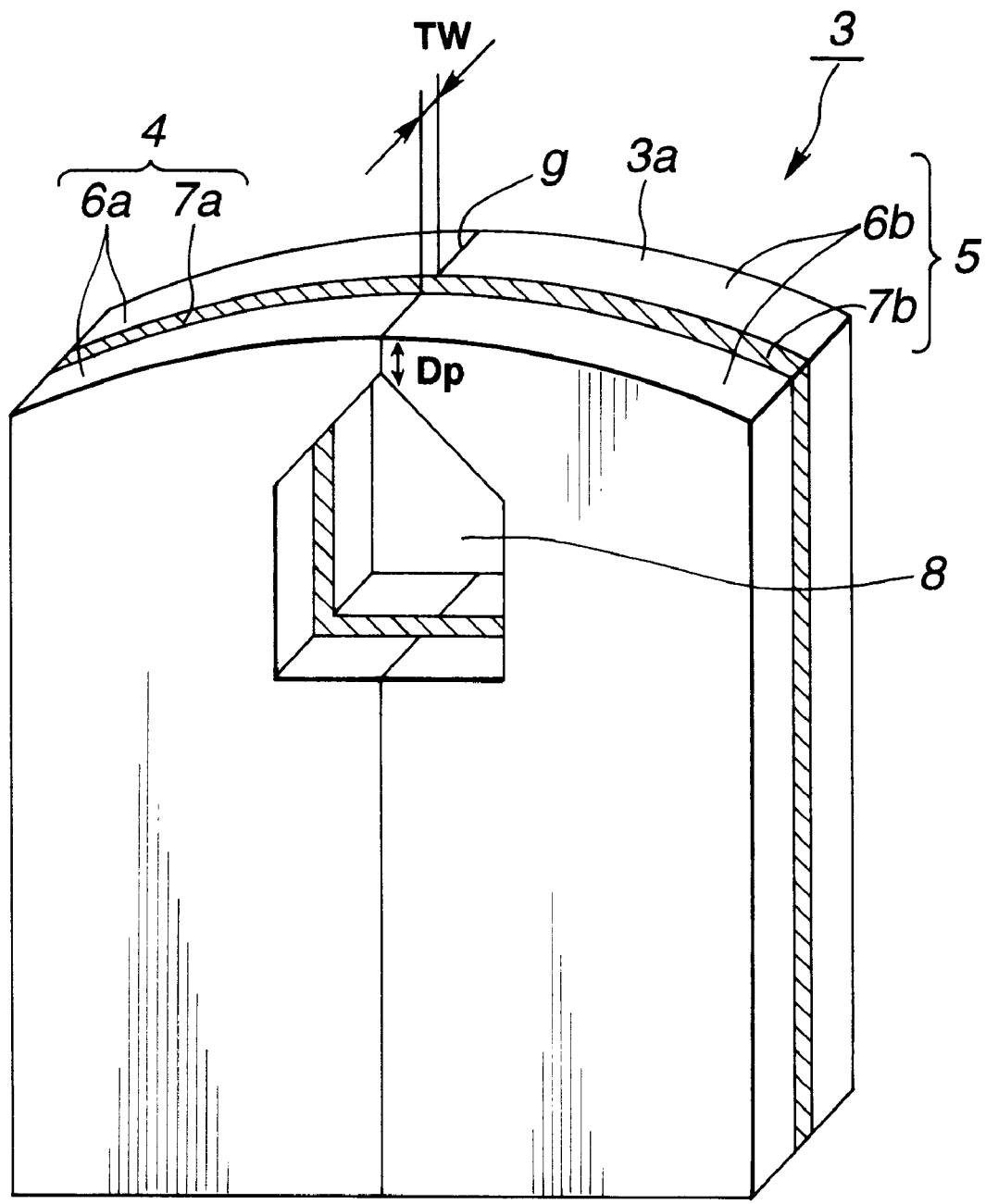
FIG. 3 shows an example of a magnetic head according to the present invention.

FIG. 3 shows such a magnetic head 3 consisting of a first magnetic core half body 4 and a second magnetic core half body 5 which are brought into abutment with each other into a unitary block. On the abutment surface defined by the first magnetic core half body 4 and the second magnetic core half body 5, there is formed a magnetic gap g.

The first magnetic core half body 4 has a magnetic layer 7a sandwiched between a pair of non-magnetic substrates 6a. Similarly as the first magnetic core half body 4, the second magnetic core half body 5 has a magnetic layer 7a sandwiched by a pair of non-magnetic substrates 6b. The first magnetic core half body 4 and the second magnetic core half body 5 are bonded to each other into a unitary block by way of glass welding in such a manner that the ends of the magnetic layers 7a and 7b face to each other, forming a closed loop in which a magnetic flux flows. Moreover, the first magnetic core half body 4 and the second magnetic core half body 5 are bonded into a unitary block, forming a magnetic gap g on a medium sliding surface 3a.

Moreover, the magnetic gap g has a track width $T_w$ defined by the film thickness of the magnetic layers 7a and 7b because the non-magnetic substrates 6a and 6b are non-magnetic bodies. Moreover, a contact width with a magnetic recording medium is defined by a dimension of a contact width between the track width $T_w$ and the first and the second magnetic core half bodies 4 and 5.

Moreover, on the abutment surface between the first magnetic core half body 4 and the second magnetic core half body 5, there is formed a coil window 8 which regulates the length $D_p$ of the magnetic gap g in the depth direction and serves as a window for winding a coil. When recording is carried out onto a magnetic recording medium, the coil is supplied with a current, generating a leak magnetic flux from the magnetic gap g for recording a signal, and reproduction is carried out, the coil detects a signal corresponding to a signal recorded on the magnetic recording medium.

Figure 4:
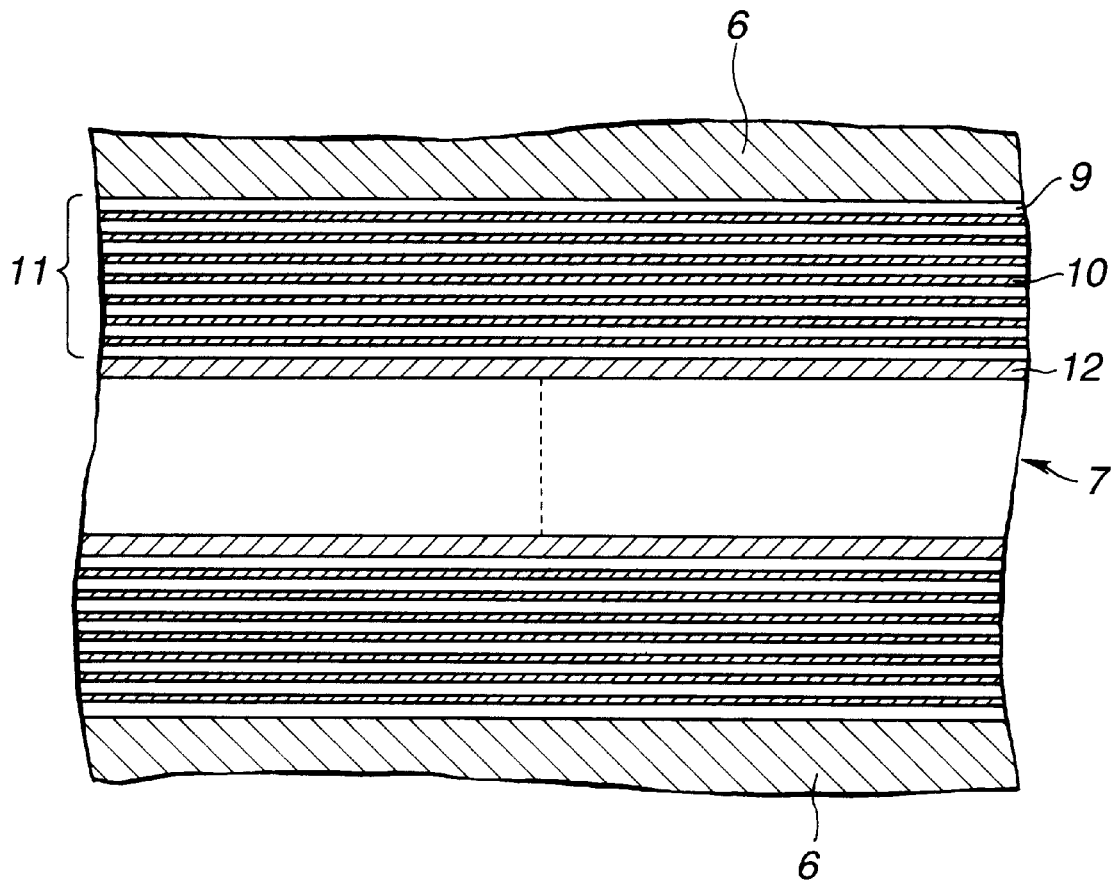
FIG. 4 is a plan view showing a configuration example of the aforementioned magnetic head.

The magnetic layers 7a and 7b have a configuration as shown in FIG. 4 in order to reduce an eddy current loss and improve the magnetic head efficiency. That is, a magnetic film 9 having a thickness of 50 to 500 nm and a non-magnetic film 10 having a thickness of 1 to 10 nm are alternately layered into a unit layered film 11, which is layered via an insulation film 12 having a thickness of 100 to 500 nm.

It should be noted that as this magnetic film 9, for example, an Fe—Ta—N—O alloy film having a thickness of about 366 nm is used. Moreover, the non-magnetic film 10 is made from $SiO_2$ having a thickness of about 10 nm. Moreover, the insulation film 12 is made from $SiO_2$ having a thickness of about 200 nm. The unit layered film 11 consists of 8 layers of the magnetic film 9 layered via the non-magnetic film 10, and has an entire thickness of about 3 $\mu$m. Moreover, five layers of the unit layered film 11 are layered via the insulation layer 12 into the layered magnetic film so as to have an entire thickness of about 15.8 mm. Moreover, in the magnetic layer 7 shown in FIG. 4, the layered magnetic films 9 are brought into abutment with each other so as to be connected in a static magnetic state at their ends. However, it is also possible that metal magnetic films are layered via an insulating film into a magnetic film which are not connected to each other in a static magnetic state.

Hereinafter, a detailed explanation will be given on a configuration of the magnetic head 3 through its production procedure.

Figure 5:
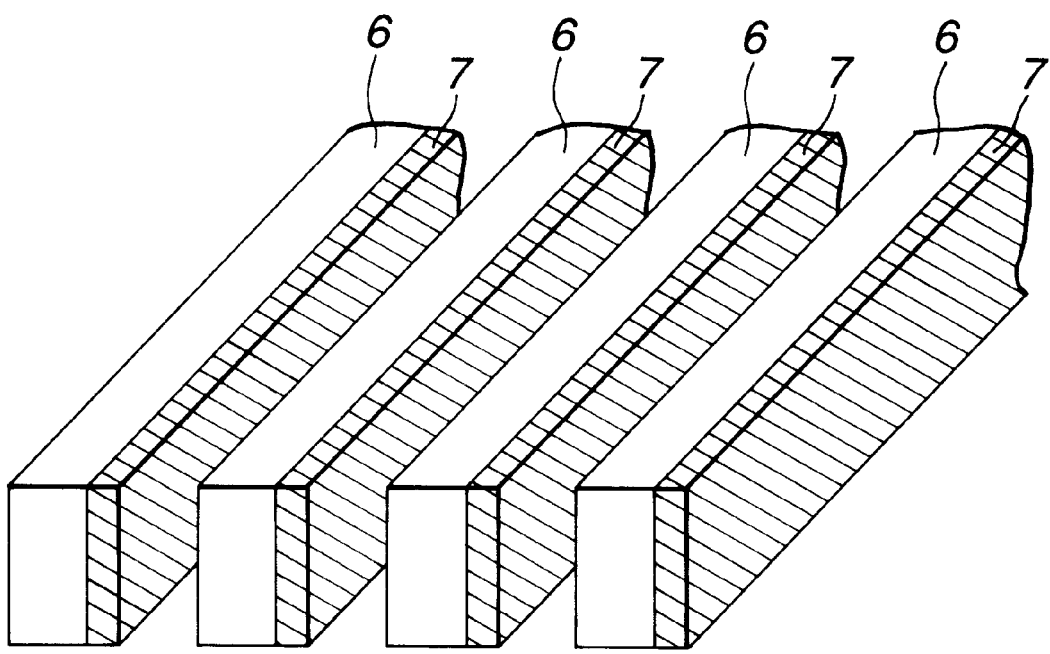
FIG. 5 is a perspective view showing an example of a magnetic layer formed on a non-magnetic substrate.

When producing this magnetic head 3, firstly, the end surface of the non-magnetic substrate 6 serving as an abutment surface and its opposite end surface are polished into a mirror surface. After this, as shown in FIG. 5, the aforementioned magnetic layer 7 is formed on one side of the non-magnetic substrate 6. When forming this magnetic layer 7, an oxygen gas is introduced into a mixed atmosphere of an argon gas and a nitrogen gas. Thus, by introducing the oxygen gas into the film formation atmosphere, it is possible to regulate the oxygen content of the soft magnetic thin film 9 constituting the magnetic layer 7. That is, when forming the aforementioned soft magnetic thin film 9, the oxygen pressure is changed with respect to the film formation atmosphere so as to control the atomic % of oxygen contained in the soft magnetic thin film 9.

More specifically this soft magnetic thin film 9 is made, for example, by using a DC magnetron sputter apparatus and using, for example, a target having a composition of $Fe_{87}Ta_{13}$, power density of about 5.0 W/$Cm^2$. with introduction of a mixed gas consisting of, for example, Ar, $N_2$, and $O_2$, so as to obtain about 0.5 Pa, and by setting an inter-electrode distance at about 60 mm. Moreover, the non-magnetic film 10 and the insulating film 12 may be formed, for example, by using a high frequency sputter apparatus. Moreover, this non-magnetic film 10 and the insulating film 12 may be formed from $SiO_2$ under conditions as follows: power density of about 1.0 W/$cm^2$, the argon pressure of about 0.4 Pa, and the inter-electrode distance of about 60 mm.

Figure 6:
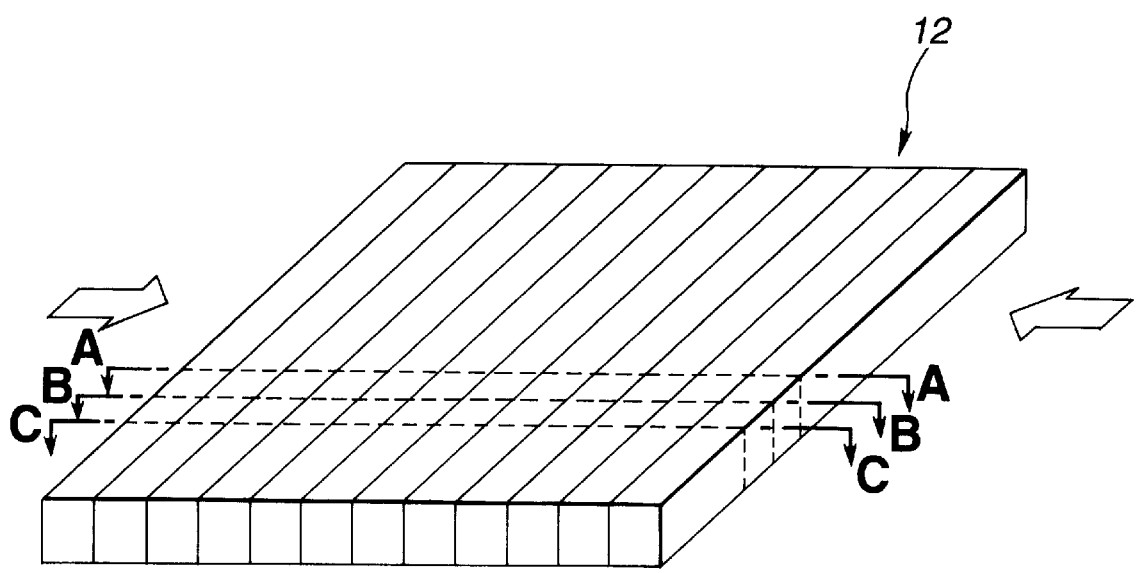
FIG. 6 is a perspective view showing an example of bonded substrate blocks each prepared from a magnetic layer formed on a non-magnetic substrate.

Next, as shown in FIG. 6, a force is applied in the direction indicated by an arrow to the non-magnetic substrate 6 covered with the aforementioned magnetic layer 7, so as to obtain a substrate block 12 in which the non-magnetic substrate 6 and the magnetic layer 7 are alternately layered.

Figure 7:
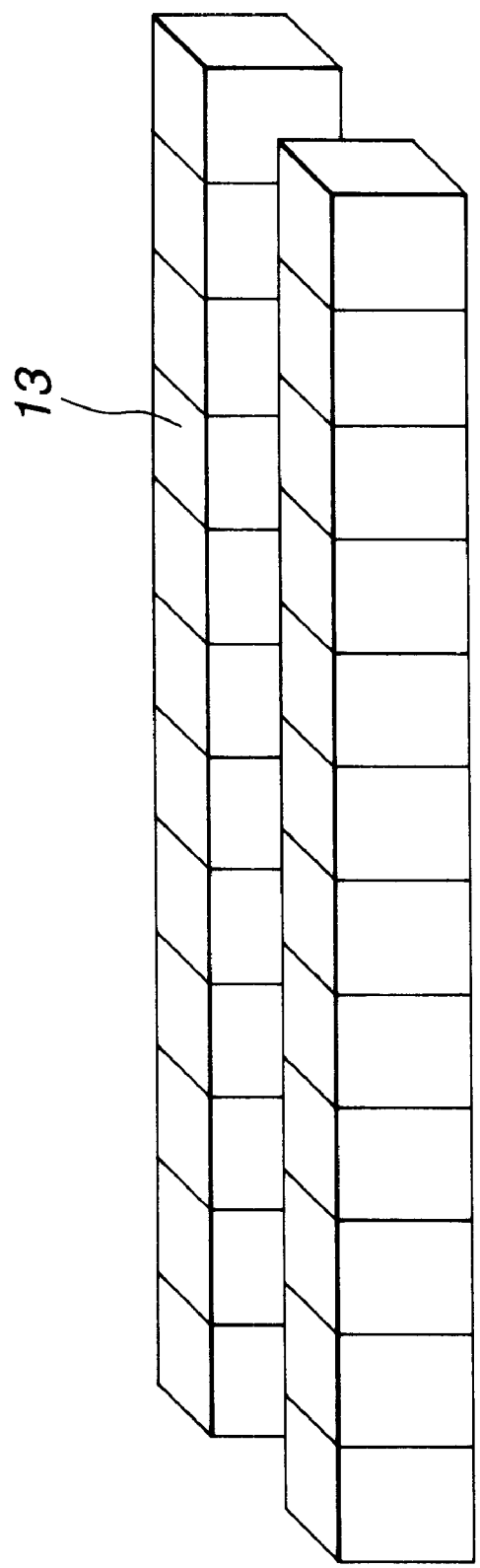
FIG. 7 is a perspective view showing an example of magnetic core half body blocks prepared by cutting a substrate block.

Next, the substrate block 12 is cut along lines which orthogonally intersect the longitudinal direction of the magnetic layer 7 such as the lines A—A. B—B, and C—C in FIG. 6, so as to obtain magnetic core half blocks 13 as shown in FIG. 7. In this magnetic core half blocks 13, a coil groove is formed on the surface for magnetic gap g forming, for coil winding over the entire abutment surface of the magnetic core half blocks.

Figure 8:
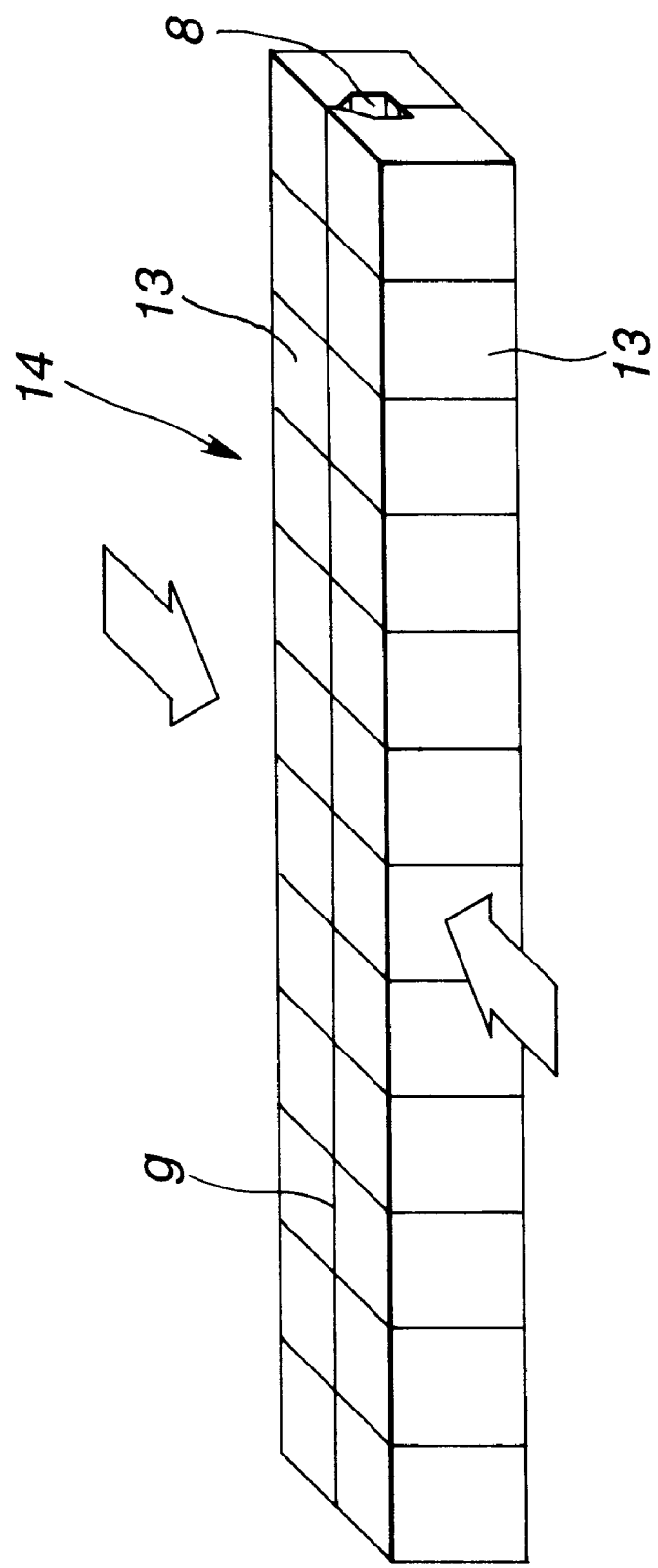
FIG. 8 is a perspective view showing a pair of magnetic core half body blocks, each having a coil groove and bonded to each other into a magnetic core block.

Next, the abutment surfaces of the magnetic core half blocks 13 are processed into a mirror surface. After this, as shown by arrows in FIG. 8, a pair of magnetic core half blocks is bonded into a unitary block, so that their abutment surfaces oppose to each other. Thus, by combining two magnetic half blocks 13, the magnetic core block 14 is prepared with the magnetic gap g formed as shown in FIG. 3.

Figure 9:
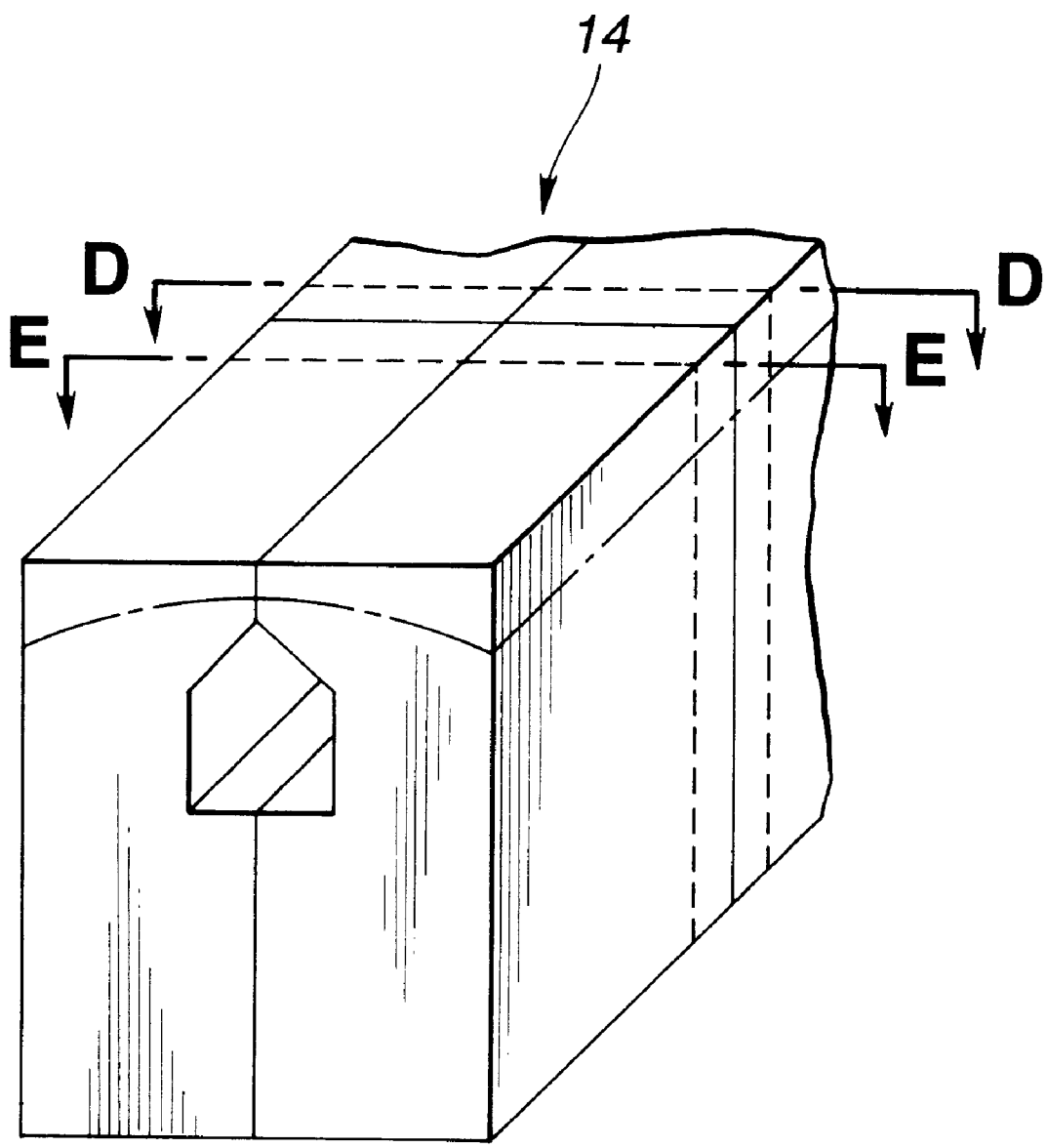
FIG. 9 is a perspective view showing the magnetic core block prior to a cylindrical polishing step and a cutting step for preparing a magnetic head.

Next, as shown in FIG. 9, the magnetic core block 9 prepared from a pair of the magnetic core half blocks 13 is subjected to a cylindrical polishing so as to obtain a configuration indicated by an alternate long and short dash line in order to assure an appropriate contact with a magnetic recording medium during recording and reproduction. After this polishing is complete, the magnetic core block 14 is cut along lines D—D and E—E shown in FIG. 9, so as to obtain the magnetic head 3 shown in FIG. 3.

It should be noted that for bonding the respective components of the magnetic head in the aforementioned magnetic head production procedure, it is possible to use a conventional known bonding method such as the low temperature thermal diffusion method in which metal films are formed on the boding surfaces and the metal films are thermally diffused to be bonded, or a method using a bonding glass or the like.

Figure 10:
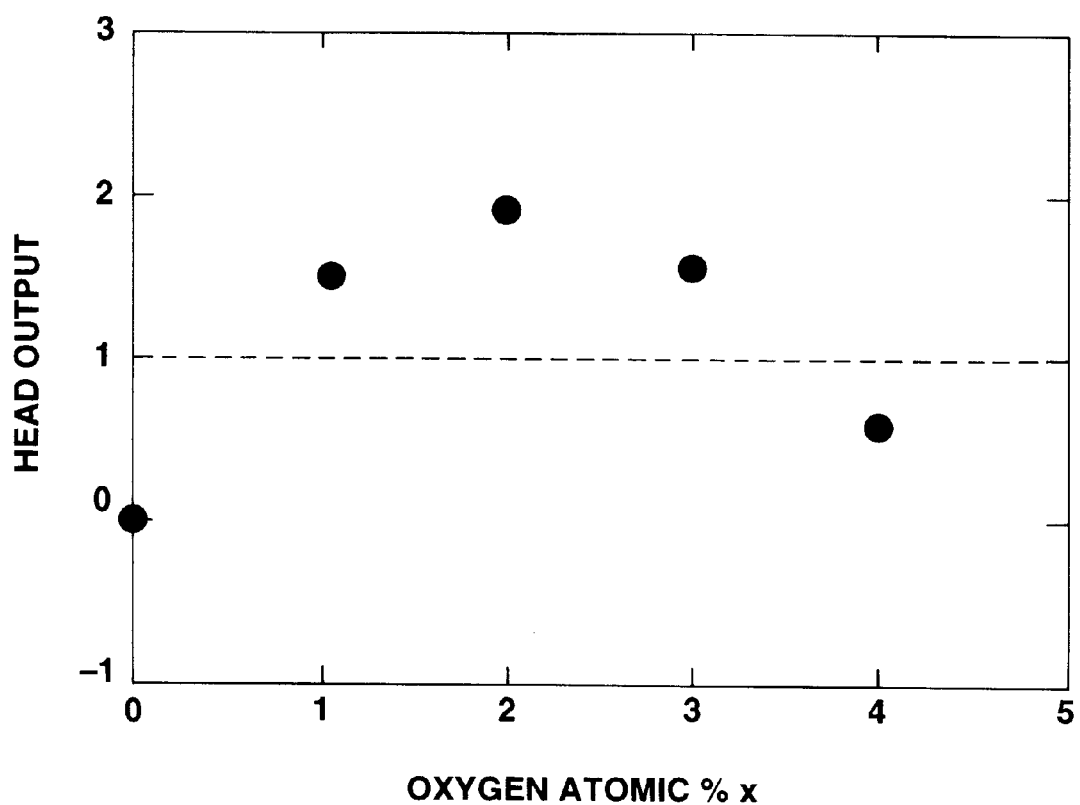
FIG. 10 shows a relationship between the oxygen atomic % and the magnetic head output.

The magnetic head 3 thus produced exhibits a head output characteristic as shown in FIG. 10. Note that in this FIG. 10, the vertical axis represents an output of the magnetic head 3 when outputting a signal which has been recorded by the magnetic head 3; and the horizontal axis represents the atomic % of oxygen contained in the magnetic film 9 constituting the magnetic layer 7.

It should be noted that this output of the magnetic head 3 is determined at 0, 1, 2, 3, and 4 atomic % of oxygen contained in the magnetic film 9 assuming its composition as $FeTaNO_x$. Moreover, the relationship between the output of this magnetic head 3 and the oxygen atomic % contained in the magnetic film 9 is measured with the recording/reproduction frequency of about 1 MHz and using as the magnetic recording medium a metal tape having a coercive force Hc of about 1450 Oe.

Moreover, in this relationship between the output of the magnetic head 3 and the oxygen atomic % contained in the magnetic film 9, 0 dB is defined by a reproduction output of a signal recorded by a magnetic head having the magnetic film 9 containing 0 atomic % of oxygen in the composition of $FeTaNO_x$.

According to this FIG. 10, when the magnetic film 9 contains 1 to about 3.5 atomic % of oxygen, the output of the magnetic head 3 is increased by 1 dB or above compared to 0 atomic % of oxygen. Especially when the magnetic head 3 using the magnetic film 9 containing about 2 atomic % of oxygen, the output is increased by about 2 dB. This is considered to come from the fact that as has been explained with reference to FIG. 1, the soft magnetic thin film 2 containing 1 to about 3.5 atomic % of oxygen exhibits a higher magnetic permeability than the soft magnetic thin film 2 containing 0 atomic % of oxygen, and the magnetic anisotropy is suppressed. That is, the magnetic head 3 using the magnetic film 9 containing 1 to about 3.5 atomic % of oxygen is capable of increasing the head characteristic by increasing the magnetic permeability of the magnetic film 9 and exhibiting a magnetic isotropy.

Moreover, the magnetic head 3 can be produced according to the aforementioned production procedure and does not require, as in the conventional production method, application of a rotational magnetic field to the magnetic layer during a thermal processing in or after the film formation for suppressing the magnetic anisotropy of the magnetic layer 7 even in a case of mass production. Thus, the production procedure can be simplified.

As has been described above, the soft magnetic thin film according to the present invention has a composition expressed as $Fe_aM_bN_cO_d$ with an oxygen content defined as 1 to 3.5 atomic % and accordingly, enables to obtain a high magnetic permeability compared to a conventional soft magnetic thin film and to obtain a magnetic isotropy, suppressing a magnetic anisotropy caused during a film formation, without carrying out a complicated production procedure. Thus, the magnetic head according to the present invention enables to improve the recording and reproduction characteristics. Moreover, this magnetic head can be produced with a magnetic layer formed without a step of application of a rotational magnetic field during a film formation or a thermal processing as in the conventional production method. This significantly simplifies the production procedure and reduces production costs.

What is claimed is:

1. A soft magnetic thin film having a composition expressed as $Fe_aM_bN_cO_d$ (wherein M represents at least one of Ta, Zr, Hf, Nb, and Ti; and a, b, c, and d represent atomic % of the respective elements), in which elements ratios a, b, c, and d are respectively in ranges as follows:

$71 \leq a \leq 85$ $6 \leq b \leq 15$ $9 \leq c \leq 16$ $1 \leq d \leq 3.5$.

2. A soft magnetic thin film as claimed in claim 1, wherein said film is formed by sputtering in an atmosphere containing oxygen.

3. A magnetic head consisting of a pair of magnetic core half bodies, each having a magnetic layer sandwiched by a pair of non-magnetic substrates, wherein said magnetic core half bodies are brought into abutment with each other so that ends of said magnetic layers oppose to each other, forming a magnetic gap on an abutment boundary between these magnetic layers, said magnetic layer, at least partially, having a composition expressed as $Fe_aM_bN_cO_d$ (wherein M represents at least one of Ta, Zr, Hf, Nb, and Ti; and a, b, c, and d represent atomic % of the respective elements), in which elements ratios a, b, c, and d are respectively in ranges as follows:

$71 \leq a \leq 85$ $6 \leq b \leq 15$ $9 \leq c \leq 16$ $1 \leq d \leq 3.5$.

4. A magnetic head as claimed in claim 3, wherein said magnetic layer is a layered magnetic film prepared by combining via an insulating film a plurality of unit layered films, each consisting of said soft magnetic thin film and a non-magnetic film which are layered alternately.

5. A magnetic head as claimed in claim 4, wherein said unit layered film has the soft magnetic thin films which are connected static-magnetically to each other.

6. A magnetic head as claimed in claim 4, wherein said unit layered film consists of soft magnetic thin films each having a thickness of 50 to 500 nm and non-magnetic films each having a thickness of 1 to 10 nm.

7. A magnetic head as claimed in claim 4, wherein said insulating film has a thickness of 100 to 500 nm.

* * * * *